United States Patent
Sadeghi

(10) Patent No.: US 8,259,908 B2
(45) Date of Patent: Sep. 4, 2012

(54) METHOD AND APPARATUS FOR METALLIC LINE TESTING OF A SUBSCRIBER LINE

(75) Inventor: Shahin Sadeghi, Cedar Park, TX (US)

(73) Assignee: Microsemi Semiconductor (U.S.) Inc., Austin, TX (US)

( * ) Notice: Subject to any disclaimer, the term of this patent is extended or adjusted under 35 U.S.C. 154(b) by 975 days.

(21) Appl. No.: 12/263,628

(22) Filed: Nov. 3, 2008

(65) Prior Publication Data

US 2010/0111151 A1 May 6, 2010

(51) Int. Cl.
*H04M 1/24* (2006.01)
*H04M 3/08* (2006.01)
*H04M 3/22* (2006.01)

(52) U.S. Cl. ............... 379/26.01; 379/1.04; 379/22.02; 379/27.03; 379/29.05

(58) Field of Classification Search ............ 379/1.01, 379/2, 9.06, 22.01, 22.02, 22.04, 23, 26.01, 379/27.01, 27.03, 27.04, 29.01, 29.05, 29.11, 379/1.04

See application file for complete search history.

(56) References Cited

U.S. PATENT DOCUMENTS

| 3,410,968 | A | * | 11/1968 | Hochreutiner | 370/200 |
| 4,196,321 | A | * | 4/1980 | Bosik | 370/249 |
| 4,206,398 | A | * | 6/1980 | Janning | 324/509 |
| 4,528,497 | A | * | 7/1985 | Arato | 324/509 |
| 6,763,109 | B1 | * | 7/2004 | Hoskins | 379/413 |
| 6,819,744 | B1 | * | 11/2004 | Banwell et al. | 379/1.01 |
| 2002/0031217 | A1 | | 3/2002 | Kiykioglu | 379/399 |
| 2007/0011478 | A1 | * | 1/2007 | Bell | 713/300 |
| 2010/0067665 | A1 | * | 3/2010 | Ray | 379/3 |

FOREIGN PATENT DOCUMENTS

EP 1 193 958 A1 4/2002
JP 2002-190844 5/2002

OTHER PUBLICATIONS

PCT Search Report and Written Opinion from PCT/US2009/060599 dated Feb. 3, 2010.

* cited by examiner

*Primary Examiner* — Binh Tieu
(74) *Attorney, Agent, or Firm* — Williams, Morgan & Amerson, P.C.

(57) ABSTRACT

A method for performing metallic line testing on a communication system is provided. The communication system includes an isolation transformer disposed between a provider circuit operable to provide a digital subscriber line signal and a subscriber circuit. The isolation transformer has a center tap. A test signal is injected at the center tap. A response of the subscriber circuit to the test signal is sensed.

20 Claims, 2 Drawing Sheets

METHOD AND APPARATUS FOR METALLIC LINE TESTING OF A SUBSCRIBER LINE

CROSS-REFERENCE TO RELATED APPLICATIONS

Not applicable.

STATEMENT REGARDING FEDERALLY SPONSORED RESEARCH OR DEVELOPMENT

Not applicable

BACKGROUND

The disclosed subject matter relates generally to communication systems and, more particularly, to a method and apparatus for metallic line testing of a subscriber line.

Over the last few years, the demand for high speed communication applications has exploded. The Internet, for example, has grown at astronomical rates over the past several years. A significant number of new Internet subscribers connect from a home or small office using a personal computer (PC).

Digital subscriber line (xDSL) technologies have been developed to provide high-speed data transmission from the service provider (e.g., the central office) to the customer premise over the existing twisted-pair copper wiring conventionally used for telephone service. Such xDSL technologies leverage modem technology to increase the data transfer bandwidth of the twisted-pair copper wiring. Typically, xDSL modems are provided on the ends of the subscriber line copper wiring to communicate between the CO and the customer's premise. The manner in which the two modems communicate is established by the particular xDSL approach used. Because the existing telephone wire is used, xDSL technologies data signals are typically transferred out-of band with the voice band signals. Because different frequencies are used for the voice band and the data band, voice and data information can be concurrently transferred over the twisted-pair copper line. In a typical xDSL example, voice information may be carried in frequency bands below 4 kHz with data being carried in frequencies above the voice band, typically from 50 kHz to 30 MHz.

More recently, service providers have increased data bandwidth by installing fiber optic cabling between the central office and a multi-service access platform (MSAP) closer to the customer. A particular MASP may interface with a bundle of twisted pairs to service a relatively small number of customer premise connections. This approach shortens the length of the copper pair between the CO interface at the MSAP and the customer, thereby allowing increased DSL data rates.

One difficulty arising from an optical connection between the central office and the MSAP lies in the ability to test the metallic lines servicing the customer premises. Previously, test equipment for conducting the metallic line testing (MELT) resided at the central office. While an MSAP equipped with both POTS and xDSL cards can provide the adequate MELT functions, there are some deployments with only an xDSL card. Such systems, cannot provide the MELT function needed to appropriately test the line. Now that the connections leaving the central office are increasingly optical, the test equipment must be located at the MSAP rather than the central office. Another difficulty arising from the optical central office arrangement is that copper twisted pairs must typically be supplied with a wetting current to prevent corrosion. Again, in instances which the MSAP contains both POTS and xDSL, such wetting current functions would be supplied by the POTS card, however, in a naked xDSL scenario, an outside source is needed to inject the wetting current. Because the central office cannot supply a wetting current through its optical connection, that function must also be distributed.

Typical DSL implementations employ an isolation transformer between the central office connection (i.e., which may be at the MSAP) and the customer premise equipment (CPE). One technique for providing metallic line testing capability involves using a relay on the line side of the isolation transformer to switch in a metallic test unit to test the copper line. A splitter is also used for impedance matching to switch from the DSL impedance (e.g., 100 ohms) to the subscriber line impedance used for testing (e.g., 600 ohms for U.S. and 900 ohms for Europe). During the metallic line testing, the DSL line card is disabled. This testing arrangement gives rise to several issues. First, DSL service for a user must be interrupted during the testing. Second, the relay and splitter network adds impedance thereby affecting the characteristics of the line, and also, when leakage is measured on the line, leakage from the relay and splitter network contributes to the overall leakage measurement.

This section of this document is intended to introduce various aspects of art that may be related to various aspects of the disclosed subject matter described and/or claimed below. This section provides background information to facilitate a better understanding of the various aspects of the disclosed subject matter. It should be understood that the statements in this section of this document are to be read in this light, and not as admissions of prior art. The disclosed subject matter is directed to overcoming, or at least reducing the effects of, one or more of the problems set forth above.

BRIEF SUMMARY

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

One aspect of the disclosed subject matter is seen in a method for performing metallic line testing on a communication system. The communication system includes an isolation transformer disposed between a provider circuit operable to provide a digital subscriber line signal and a subscriber circuit. The isolation transformer has a center tap. A test signal is injected at the center tap. A response of the subscriber circuit to the test signal is sensed.

Another aspect of the disclosed subject matter is seen in an apparatus for performing metallic line testing on a communication system including an isolation transformer disposed between a provider circuit operable to provide a digital subscriber line signal and a subscriber circuit. The isolation transformer has a center tap. A metallic line testing driver includes at least one terminal for coupling to the center tap and is operable to inject a test signal into the center tap. A metallic line testing controller has at least one terminal for coupling to the subscriber circuit and is operable to sense a response of the subscriber circuit to the test signal.

Yet another aspect of the present invention is seen in a communication system including a provider circuit, a subscriber circuit, an isolation transformer, a metallic line testing driver, and a metallic line testing controller. The provider circuit is operable to provide a digital subscriber line signal. The isolation transformer is coupled between the provider circuit and the subscriber circuit and has a first coil coupled to a first line of the subscriber circuit, a second coil coupled to a second line of the subscriber circuit, and a center tap defined between the first and second coils. The metallic line testing driver is coupled to the center tap and is operable to inject a test signal into the subscriber circuit. The metallic line testing controller is coupled to the first and second lines and is operable to sense a response of the subscriber circuit to the test signal.

BRIEF DESCRIPTION OF THE SEVERAL VIEWS OF THE DRAWINGS

The disclosed subject matter will hereafter be described with reference to the accompanying drawings, wherein like reference numerals denote like elements, and.

Figure 1:
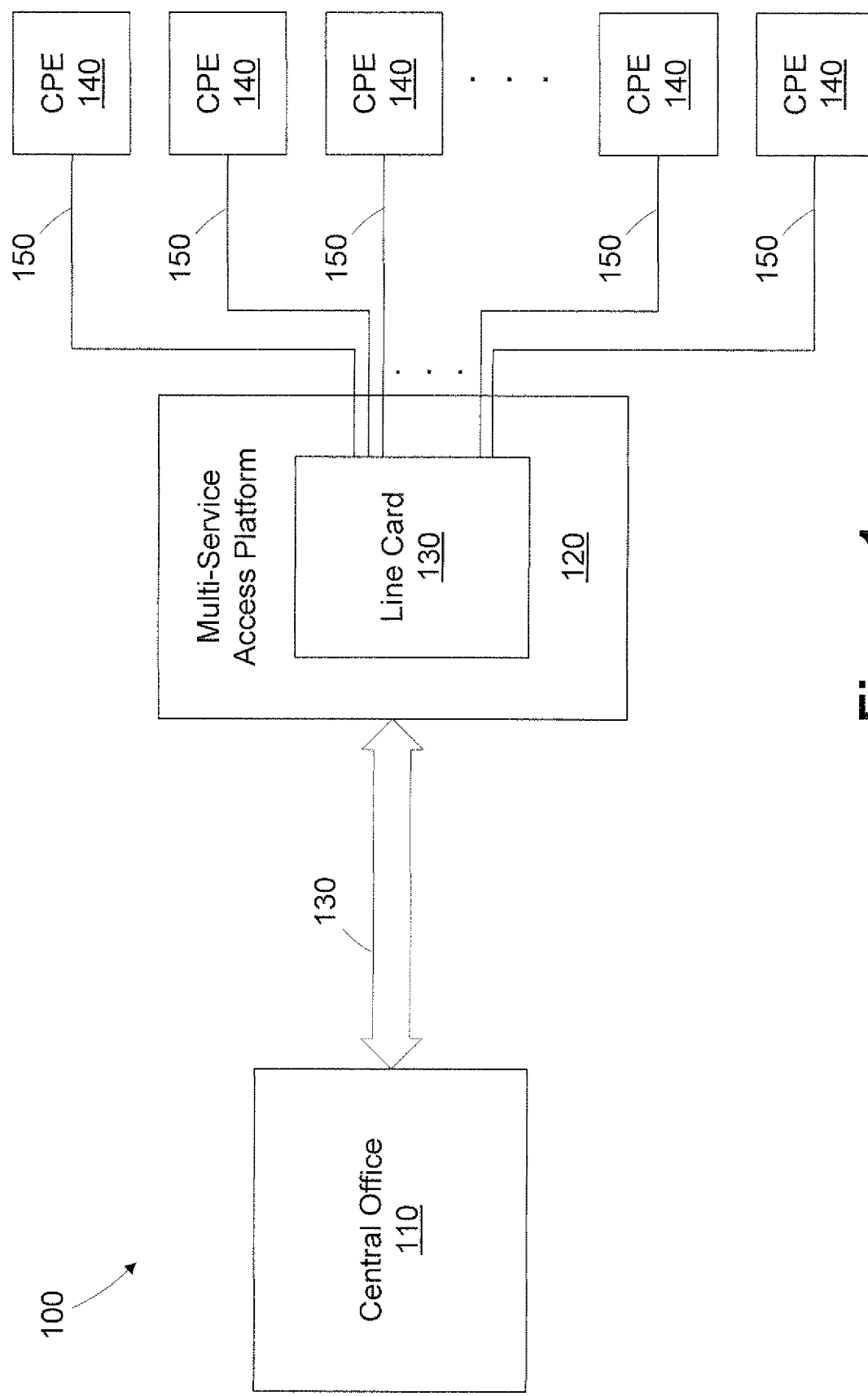
FIG. 1 is a simplified block diagram of a communication system in accordance with one illustrative embodiment of the present subject matter.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the spirit and scope of the disclosed subject matter as defined by the appended claims.

DETAILED DESCRIPTION

One or more specific embodiments of the disclosed subject matter will be described below. It is specifically intended that the disclosed subject matter not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the disclosed subject matter unless explicitly indicated as being "critical" or "essential."

The disclosed subject matter will now be described with reference to the attached figures. Various structures, systems and devices are schematically depicted in the drawings for purposes of explanation only and so as to not obscure the disclosed subject matter with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Referring now to the drawings wherein like reference numbers correspond to similar components throughout the several views and, specifically, referring to FIG. 1, the disclosed subject matter shall be described in the context of a communication system 100. The communication system 100 includes a central office 110 coupled to a multi-service access platform (MSAP) 120 by an optical link 130. The MSAP 120 includes a line card 130 for interfacing with one or more pieces of customer premises equipment 140 through twisted pair connections 150. In the illustrated embodiment, the twisted pair connections 150 are used only for digital subscriber line (DSL) communication, commonly referred to as naked DSL lines. Of course, the application of the present subject matter is not limited to such applications. Hence, the twisted pair connections 150 may be used to support voice as well as DSL communication.

Figure 2:
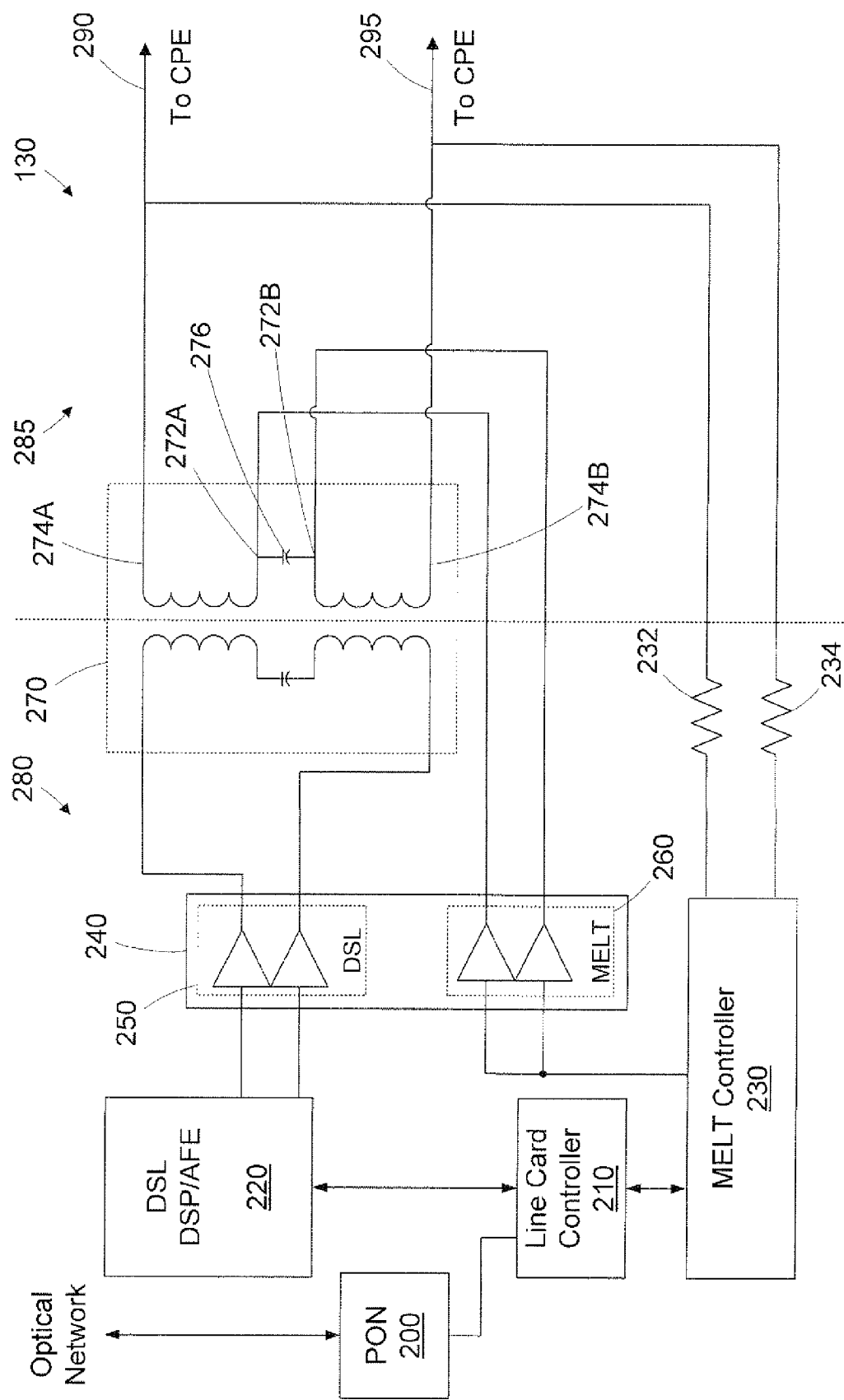
FIG. 2 is a simplified block diagram of a line card used in the communications system of FIG. 1.

Turning now to FIG. 2, a simplified block diagram of the line card 130 is shown. The diagram is intended to be representative in nature in that the functions attributed to the elements of the line card 130 may be distributed differently, and more than one circuit board may actually be present. The line card 130 includes a passive optical network (PON) interface 200, a line card controller 210, a DSL digital signal processor (DSP)/analog front end (AFE) unit 220, a metallic line test (MELT) controller 230, a driver circuit 240 including a DSL driver 250 and a MELT driver 260, and an isolation transformer 270.

The PON 200 serves as the optical interface with the central office 110. The line card controller 210 includes a microprocessor implementing software for communicating with the central office 110 and conducting the DSL communication functions by controlling the DSL DSP/AFE unit 220. The DSL DSP/AFE unit 220 controls the DSL driver 250 for driving the DSL signals. The isolation transformer 270 isolates a provider circuit 280 for providing the DSL service from a subscriber circuit 285 for servicing the CPE 140. In general, the construction and operation of the PON 200, line card controller 210, DSL DSP/AFE unit 220, the DSL driver 250, and the isolation transformer 270 are conventional and known to those of ordinary skill in the art. For ease of illustration and to avoid obscuring the present subject matter, they are not described in greater detail herein.

The MELT controller 230 and MELT driver 260 cooperate to implement metallic line testing of the subscriber line defined by the subscriber line 290, 295 (i.e., twisted pair tip and ring lines). The MELT controller 230 employs resistors 232, 234 for sensing voltages on the subscriber line 290, 295. Although the resistors 232, 234 are illustrated as being separate from the MELT controller 230, it is contemplated that they may be integrated therein. The general operation of the MELT controller 230 for injecting test signals using the MELT driver 260 and monitoring and analyzing the results are known to those of ordinary skill in the art. The MELT driver 260 injects DC signals and the MELT controller 230 analyzes the response of the subscriber line to determine characteristics thereof. An exemplary, but not exhaustive or limiting, list of MELT tests includes foreign voltage detection, DC loop resistance, receiver off hook status, insulation resistance, line short, ringer equivalency, noise measurement, trans-hybrid loss, DC feed self test, on/off hook self test, ringing self test, transmission self test, ringing monitoring, read loop and battery conditions, capacitance, foreign currents, dual tone multi frequency (DTMF) tests, tone generation tests, dial tone tests, metering test, dialing test, howler test, in-service calibration, cross testing of other lines, SNR and quantization distortion, fuse test, socket detection test, transmission test, current measurement, voltage measurement, etc.

The MELT driver 260 is coupled to a center tap 272A, 272B of the line side coils 274A, 274B of the isolation transformer 270 and outputs a differential signal. It is common in DSL applications to provide a capacitor 276 between the coils 274A, 274B, but the capacitor 276 is optional. The DSL driver 250 may be used to inject signals if the coils 274A, 274B are connected by a short circuit. In such a case, the MELT Driver 260 is effectively coupled across the tip line 290 and the ring line 295, due to the DC nature of the signals.

In some embodiments, the MELT controller 230 may also be used to provide a wetting current for the subscriber line 290, 295. A wetting current is typically used in copper twisted pair environments to prevent corrosion of the lines. Typically, a wetting current is provided as a constant DC voltage or as periodic DC pulses. The particular type of wetting current depends on the particular implementation and the characteristics of the customer premises equipment 140. If there is an impedance across the lines 290, 295, the constant DC voltage approach may be used. In the absence of an impedance, the periodic DC pulse approach may be used. The MELT controller 230 may be configured by the system operator through the interface with the line card controller 210 to statically set the wetting current parameters (i.e., constant DC, periodic pulse DC, or no wetting current) or to dynamically determine the requirements by sensing if an impedance is present.

Driving the MELT signals using the center tap 272A, 272B of the isolation transformer 270 has numerous advantages. This arrangement allows the DC signals to be injected with minimal impact to the DSL portion of the system. Hence, DSL communication may continue during the MELT testing. Also, the need for additional circuitry to support the MELT testing, such as a relay and/or splitter network, is avoided, thereby reducing the inaccuracies introduced into the test results.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the disclosed subject matter. Accordingly, the protection sought herein is as set forth in the claims below.

I claim:

1. An apparatus for performing metallic line testing on a communication system including an isolation transformer disposed between a provider circuit operable to provide a digital subscriber line signal and a subscriber circuit, the isolation transformer having a center tap, comprising:
    a metallic line testing driver including at least one terminal for coupling to the center tap of the isolation transformer on a subscriber circuit side and being operable to inject a test signal into the center tap; and
    a metallic line testing controller having at least one terminal for coupling to the subscriber circuit and being operable to sense a response of the subscriber circuit to the test signal.

2. The apparatus of claim 1, wherein the test signal comprises a direct current signal.

3. The apparatus of claim 1, wherein the metallic line testing controller is coupled to the metallic line testing driver and operable to configure the test signal.

4. The apparatus of claim 1, wherein the isolation transformer includes a first coil coupled to a first line of the subscriber circuit, a second coil coupled to a second line of the subscriber circuit, and the at least one terminal of the metallic line testing driver comprises a first terminal for coupling to the first coil at the center tap and a second terminal for coupling to the second coil at the center tap.

5. The apparatus of claim 4, wherein the at least one terminal of the metallic line testing controller comprises a first terminal for coupling to the first line and a second terminal for coupling to the second line.

6. The apparatus of claim 4, wherein the isolation transformer comprises a capacitor coupled between the first and second coils, and the first and second terminals are coupled across the capacitor.

7. A communication system, comprising:
    a provider circuit operable to provide a digital subscriber line signal;
    a subscriber circuit;
    an isolation transformer coupled between the provider circuit and the subscriber circuit and having a first coil coupled to a first line of the subscriber circuit, a second coil coupled to a second line of the subscriber circuit, and a center tap defined between the first and second coils;
    a metallic line testing driver coupled to the center tap of the isolation transformer on a subscriber circuit side and being operable to inject a test signal into the subscriber circuit; and
    a metallic line testing controller coupled to the first and second lines and being operable to sense a response of the subscriber circuit to the test signal.

8. The system of claim 7, wherein the test signal comprises a direct current signal.

9. The system of claim 7, wherein the metallic line testing controller is coupled to the metallic line testing driver and operable to configure the test signal.

10. The system of claim 7, further comprising a first resistor coupled between the metallic line testing controller and the first line and a second resistor coupled between the metallic line testing controller and the second line.

11. The system of claim 7, wherein the isolation transformer comprises a capacitor coupled between the first and second coils, and the metallic line testing driver includes first and second terminals coupled across the capacitor.

12. The system of claim 7, wherein the metallic line testing driver includes first and second terminals coupled to the center tap and operable to provide the test signal, and the test signal comprises a differential signal.

13. The system of claim 7, wherein the provider circuit is operable to maintain the digital subscriber line signal during a time period that the metallic line testing driver injects the test signal and the metallic line testing controller senses the response.

14. A method for performing metallic line testing on a communication system including an isolation transformer disposed between a provider circuit operable to provide a digital subscriber line signal and a subscriber circuit, the isolation transformer having a center tap, comprising:

injecting a test signal at the center tap of the isolation transformer on a subscriber circuit side; and sensing a response of the subscriber circuit to the test signal.

15. The method of claim 14, wherein the test signal comprises a direct current signal.

16. The method of claim 14, wherein the isolation transformer comprises a first coil coupled to a first line of the subscriber circuit, a second coil coupled to a second line of the subscriber circuit, and the center tap is defined between the first and second coils, and wherein injecting the test signal comprises injecting the test signal between the first and second coils.

17. The method of claim 16, wherein the test signal comprises a differential signal.

18. The method of claim 14, wherein the isolation transformer comprises a first coil coupled to a first line of the subscriber circuit, a second coil coupled to a second line of the subscriber circuit, and a capacitor coupled between the first and second coils, and wherein injecting the test signal comprises injecting the test signal across the capacitor.

19. The method of claim 18, wherein the test signal comprises a differential signal.

20. The method of claim 14, further comprising maintaining the digital subscriber line signal during a time period that includes the injecting of the test signal and the sensing of the response.

* * * * *